United States Patent
Chehlarov

(10) Patent No.: US 11,067,454 B2
(45) Date of Patent: Jul. 20, 2021

(54) STABILITY OF A RESISTANCE TEMPERATURE DETECTOR

(71) Applicant: SENSATA TECHNOLOGIES, INC., Attleboro, MA (US)

(72) Inventor: Nikolay S. Chehlarov, Sofia (BG)

(73) Assignee: SENSATA TECHNOLOGIES, INC., Attleboro, MA (US)

(*) Notice: Subject to any disclaimer, the term of this patent is extended or adjusted under 35 U.S.C. 154(b) by 185 days.

(21) Appl. No.: 16/518,952

(22) Filed: Jul. 22, 2019

(65) Prior Publication Data

US 2021/0025764 A1    Jan. 28, 2021

(51) Int. Cl.
| | |
|---|---|
| *G01K 7/16* | (2006.01) |
| *G01K 1/00* | (2006.01) |
| *G01K 15/00* | (2006.01) |
| *G01K 7/18* | (2006.01) |
| *G01K 1/08* | (2021.01) |

(52) U.S. Cl.
CPC .............. *G01K 7/183* (2013.01); *G01K 1/08* (2013.01)

(58) Field of Classification Search
USPC ............................................ 374/185, 1, 208
See application file for complete search history.

(56) References Cited

U.S. PATENT DOCUMENTS

| | | | |
|---|---|---|---|
| 4,791,398 A | 12/1988 | Sittler et al. | |
| 5,041,809 A * | 8/1991 | Payne | G01K 7/18 |
| | | | 338/25 |
| 5,221,916 A | 6/1993 | McQueen | |
| 5,959,524 A | 9/1999 | Wienand et al. | |
| 6,341,892 B1 | 1/2002 | Schmermund | |
| 7,719,400 B1 | 5/2010 | Bernier et al. | |
| 8,651,737 B2 * | 2/2014 | Cole | G01N 27/123 |
| | | | 374/185 |
| 9,606,006 B2 | 3/2017 | Wienand et al. | |
| 2009/0026894 A1 | 1/2009 | Lesmeister et al. | |
| 2009/0304043 A1 * | 12/2009 | Glehr | G01K 7/21 |
| | | | 374/183 |
| 2011/0026562 A1 | 2/2011 | Bernier et al. | |
| 2014/0063900 A1 * | 3/2014 | Heller | G11C 16/20 |
| | | | 365/148 |
| 2014/0219316 A1 * | 8/2014 | Tashiro | G01K 7/22 |
| | | | 374/185 |
| 2020/0377137 A1 * | 12/2020 | Lamesch | B62D 1/065 |

OTHER PUBLICATIONS

International Search Report and Written Opinion, PCT/US2020/039184, dated Sep. 17, 2020, 11 pages.

* cited by examiner

*Primary Examiner* — Mirellys Jagan
(74) *Attorney, Agent, or Firm* — Mark H. Williams

(57) ABSTRACT

In a particular embodiment of the present disclosure, an apparatus is disclosed for improving for the stability of a resistance temperature detector (RTD). In this particular embodiment, the apparatus includes an RTD having a case surrounding a resistive meander deposited on a substrate. The RTD also includes a pull-down resistor. A first end of the resistive meander is configured for coupling to a positive power supply. The second end of the resistive meander is coupled to a first end of the pull-down resistor. The second end of the pull-down resistor is coupled to a ground. The case of the RTD is also coupled to the ground.

20 Claims, 13 Drawing Sheets

```
┌─────────────────────────────────────────────────────────────────────────┐
│ Coupling A Measuring Circuit To The First End Of The Resistive Meander  │
│         And To The Second End Of The Resistive Meander 1102             │
└─────────────────────────────────────────────────────────────────────────┘
                                    │
                                    ▼
┌─────────────────────────────────────────────────────────────────────────┐
│ Coupling The Case Of The RTD And The Second End Of The Pull-down        │
│                    Resistor To A Ground 1002                             │
└─────────────────────────────────────────────────────────────────────────┘
                                    │
                                    ▼
┌─────────────────────────────────────────────────────────────────────────┐
│     Providing Positive Power To The First End Of The Resistive          │
│                         Meander 1004                                     │
└─────────────────────────────────────────────────────────────────────────┘
                                    │
                                    ▼
┌─────────────────────────────────────────────────────────────────────────┐
│                  Determining A Voltage Difference 1104                   │
└─────────────────────────────────────────────────────────────────────────┘
                                    │
                                    ▼
┌─────────────────────────────────────────────────────────────────────────┐
│ Determining A Temperature Being Measured By The RTD Based On The        │
│                     Voltage Difference 1106                              │
└─────────────────────────────────────────────────────────────────────────┘
```

FIG. 11

Inserting A Pull-up Resistor Between A Power Supply And The First End Of The Resistive Meander Such That A First End Of The Pull-up Resistor Is Coupled To The Power Supply And The Second End Of The Pull-up Resistor Is Coupled To The First End Of The Resistive Meander 1202

↓

Coupling The Case Of The RTD And The Second End Of The Pull-down Resistor To A Ground 1002

↓

Providing Positive Power To The First End Of The Resistive Meander 1004

Providing Power To The First End Of The Pull-up Resistor 1204

FIG. 12

STABILITY OF A RESISTANCE TEMPERATURE DETECTOR

FIELD OF THE INVENTION

The present disclosure relates to electric circuits and more particularly to apparatuses and methods for improving the stability of a resistance temperature detector.

BACKGROUND OF THE INVENTION

A resistance temperature detector (RTD) (also known as resistance thermometer) is a passive circuit element whose resistance increases with increasing temperature in a predictable manner. The traditional RTD includes a non-conductive cylinder with a sensing element constructed of a conductive material, such as cooper or nickel wire, wrapped to form a precise resistance value. A measuring circuit may be connected to the wire to measure the change in the resistance of the sensing element by converting the resistance into a voltage.

The reliability of an RTD to consistently provide accurate readings is a function of the RTD's ability to maintain the same resistance verses temperature relationship for the same conditions over time. The drift or change in the resistance verses temperature relationship of an RTD may be affected by a number of factors, some of which are configuration specific. In the type of traditional RTD discussed above, the coils of the sensing element may be susceptible to shock or vibration, which may change the resistance of the coils by moving their positions relative to each other. Coating this type of RTD with an insulating barrier, such as molten glass or ceramic cement, may reduce movement of the coils, but the differences in coefficients of thermal expansion may still result in this type of RTD being prone to stress induced resistance change.

Recently, RTDs have been manufactured using a thin layer of resistive material (also known as a resistive meander), such as platinum or nickel-iron metal, deposited on a ceramic substrate. This type of thin-film construction results in less metal being used over less area, which makes these RTDs, smaller, cheaper, and faster to respond than the traditional wire wrapped RTDs. However, the stability or drift of a thin-film RTD may be impacted by contamination of the resistive meander during production or use. For example, if the resistive meander of a thin-film RTD is contaminated by a partially conductive foreign material, the foreign matter may have a different temperature coefficient of resistance (TCR) than the resistive meander material. In this example, as the temperature changes, the resistance of the resistive meander would change by a different amount than the resistance of the foreign material, resulting in RTD drift. In addition, the foreign material may further impact drift by reducing the resistance of the RTD sensing element by providing an alternative path for conduction.

To shield the resistive meander from contamination, thin-film RTD manufacturers often apply a passivating layer of electrically insulating barrier material, such as glass, over the resistive meander. However, in some RTD applications, this type of mechanical barrier may not sufficiently protect the resistive meander from contamination, resulting in some accumulation of foreign atoms on the resistive meander and an unacceptable change in the ability of the RTD to maintain the same resistance versus temperature relationship for the same conditions over time.

SUMMARY OF THE INVENTION

In a particular embodiment of the present disclosure, an apparatus is disclosed for improving for the stability of a resistance temperature detector (RTD). In this particular embodiment, the apparatus includes an RTD having a case surrounding a resistive meander deposited on a substrate. The RTD also includes a pull-down resistor. A first end of the resistive meander is configured for coupling to a positive power supply. The second end of the resistive meander is coupled to a first end of the pull-down resistor. The second end of the pull-down resistor is coupled to a ground. The case of the RTD is also coupled to the ground. During operation of this apparatus in which power is provided to the first end of the resistive meander, because the second end of the resistive meander is coupled to the first end of the pull-down resistor, the voltage potential of the second end of the resistive meander is higher than the case of the RTD.

One advantage of an RTD apparatus in which the voltage potential of the resistive meander is higher than the case of the RTD is that foreign matter having a positive charge will move away from the resistive meander and towards objects with a lower charge, such as the ground and the case of the RTD. As explained above, foreign matter may affect measurements of the voltage potential across the resistive meander, and thus the ability of the RTD to maintain the same resistance versus temperature relationship for the same conditions over time. Therefore, an apparatus that prevents foreign matter from contaminating the resistive meander of the RTD improves the stability of the RTD and is an advantage over the prior art.

The foregoing and other objects, features, and other advantages of the present disclosure will be apparent from the following more particular descriptions of exemplary embodiments of the present disclosure as illustrated in the accompanying drawings wherein like reference numbers generally represent like parts of exemplary embodiments of the present disclosure.

BRIEF DESCRIPTION OF THE DRAWINGS

So that those having ordinary skill in the art to which the disclosed technology appertains will more readily understand how to make and use the same, reference may be had to the following drawings.

FIG. 11 is a flow chart of a method for improving the stability of an RTD, according to at least one embodiment of the present disclosure.

FIG. 12 is a flow chart of a method for improving the stability of an RTD, according to at least one embodiment of the present disclosure.

DETAILED DESCRIPTION

Figure 1:
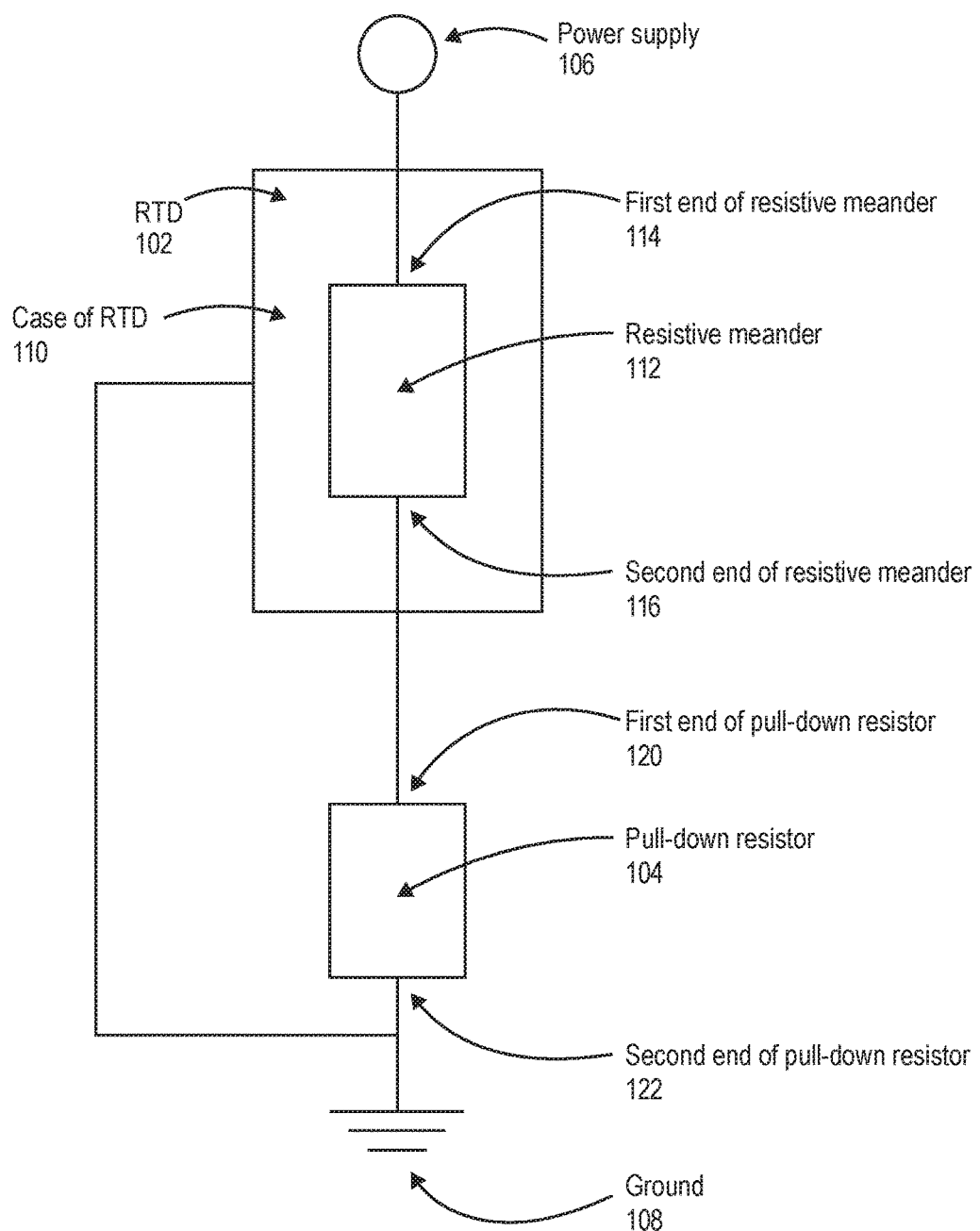
FIG. 1 is a block diagram of an apparatus for improving the stability of a resistance temperature detector (RTD), according to at least one embodiment of the present disclosure.

The present disclosure describes apparatuses and methods for improving the stability of a resistance temperature detector (RTD). As explained above, the stability or drift in the temperature resistance relationship of an RTD may be impacted by contamination of a resistive meander of the RTD during production or use of the RTD. Another common cause of drift is due to low resistance of the insulators. As will be described in detail below, according to embodiments of the present disclosure, an apparatus having an RTD may be configured with a pull-down resistor such that when power is provided to the apparatus, the voltage potential of the resistive meander is higher than the case of the RTD. Because the voltage potential of the RTD's resistive meander is higher than the case of the RTD, foreign matter having a positive charge (e.g., sodium ions) will move away from the resistive meander and towards objects with a lower charge, such as the ground and the case of the RTD. As explained above, foreign matter may affect measurements of the voltage potential across the resistive meander and thus the ability of the RTD to maintain the same resistance versus temperature relationship for the same conditions over time. Therefore, an apparatus that prevents foreign matter from contaminating the resistive meander of the RTD improves the stability of the RTD and is an advantage over the prior art.

The other advantages, and other features of the apparatuses and methods disclosed herein, will become more readily apparent to those having ordinary skill in the art from the following detailed description of certain embodiments taken in conjunction with the drawings which set forth representative embodiments of the present invention. Like reference numerals are used herein to denote like parts.

FIG. 1 is a block diagram of an apparatus (100) for improving the stability of an RTD (102), according to at least one embodiment of the present disclosure. In the example of FIG. 1, the RTD (102) has a case (110) surrounding a resistive meander (112) deposited on a substrate (118). As explained above an RTD may be manufactured by many methods. To create the resistive meander on a thin film RTD, resistive material may be deposited on a substrate and then laser-trimmed to a desired reference resistance. Examples of resistive material for the resistive meander include but are not limited to platinum, nickel, copper, and nickel/iron.

The RTD (102) also includes a pull-down resistor (104). The pull-down resistor is a resistor that can be coupled to the resistive meander. In the example of a thin-film RTD, the pull-down resistor may also be formed by depositing resistive material on the substrate and laser trimming to a specific reference resistance. Readers of skill in the art will realize that the pull-down resistor may be created with any material that is coupled to the RTD in the pull-down configuration. For example, the pull-down resistor may be formed using wires coupled to the RTD to create a particular resistance.

In the example of FIG. 1, a first end (114) of the resistive meander (112) is configured for coupling to a positive power supply (106). A second end (116) of the resistive meander (112) is coupled to a first end (120) of the pull-down resistor (104). The second end (122) of the pull-down resistor (104) is coupled to a ground (108). The case (110) of the RTD (102) is also coupled to the ground (108). A variety of materials may be used to form the wires and insulation that couple the resistive meander, the pull-down resistor, and other components (e.g., a measuring circuit) together. The type of wire and insulation may impact the maximum application temperature of the RTD. Examples of wire material may include but are not limited to: inconel, stainless steel, tinned copper, silver plated copper, nickel plated copper, and solid nickel wire. Examples of insulation material may include but are not limited to: magnesium oxide, aluminum oxide, polyvinyl chloride (PVC) insulation, fluorinated ethylene propylene (FEP) Teflon insulation, Tetrafluoroethylene (TFE)Teflon insulation, fiberglass insulation, and no insulation.

During operation of the apparatus (100) in which power is provided to the first end (114) of the resistive meander (112), because the second end (116) of the resistive meander (112) is coupled to the first end (120) of the pull-down resistor (104), the voltage potential of the second end (116) of the resistive meander (112) is higher than the case (110) of the RTD (102). Because the voltage potential of the RTD's resistive meander is higher than the case of the RTD, positive charged ions (e.g., sodium ions) will be drawn to the lowest voltage potential. In the configuration described in FIG. 1, the ground and the case of the RTD have a lower potential than both the first end (114) and the second end (116) of the resistive meander (112). Foreign matter may affect measurements of the voltage potential across the resistive meander, and thus the ability of the RTD (102) to maintain the same resistance versus temperature relationship for the same conditions over time. Therefore, an apparatus, such as the apparatus (100) of FIG. 1, which prevents positive charged foreign matter from contaminating the resistive meander (112) of the RTD (102), improves the stability of the RTD.

The specific configuration and placement of a resistor in an apparatus relative to an RTD impacts the functioning of the RTD. For example, if instead of coupling the first end (120) of the pull-down resistor (104) to the second end (116) of the resistive meander (112) and coupling the second end (122) of the pull-down resistor (104) to the ground (108), another resistor is coupled between the positive power supply (106) and the RTD (102), the performance and stability of the RTD (102) may be markedly different. In this example, the other resistor may be considered a "pull-up resistor configuration" having a first end that is coupled to the positive power supply (106) and a second end that is coupled to the first end (112) of the resistive meander (112). In this "pull-up resistor configuration", which does not include a pull-down resistor, the voltage potential of the first end of the resistive meander has a higher potential than the case of the RTD. In this pull-up resistor configuration, the second end of the resistive meander may have a lower potential such that foreign positive ion contaminants may accumulate around the second end of the resistive meander and any leads coupled to a measuring circuit. This contamination or poisoning of the resistive meander may affect the measurements determined by the measuring circuit. As explained above, one of the advantages of the apparatus (100) of FIG. 1 is that the pull-down resistor (104) protects both the first end (114) and the second end (116) of the resistive meander (112). In addition to the disadvantage of only protecting the first end of the resistive meander, the "pull-up resistor configuration" also is susceptible to low insulation resistance from the case and the wires/leads coupled to the resistive meander, which may result in significant reading errors reported by the RTD.

In contrast in addition to reducing or eliminating poisoning of the resistive meander, the unique configuration and placement of the pull-down resistor (104) in the apparatus (100) of FIG. 1, also minimizes the effect of the low insulation resistance of the case (110) and lead wires on reading error from the RTD (102). There are several insulation resistances. For example, there may be insulation resistances between leads of the resistive meander; between one lead of the resistive meander and the case; and between the other lead of the resistive meander and the case. The ratios of these insulation resistances depend on the geometry of the sensor. The pull-down resistor value can be selected based on the geometry of the sensor. In a particular embodiment, the best pull-down resistor value balances the effect of low insulation resistances. Therefore, reducing the effect of low insulation resistance is another advantage of the apparatus (100) of FIG. 1 over a "pull-up resistor configuration", which does not include a pull-down resistor. Furthermore, preventing contamination of the resistive meander and reducing low insulation resistance may also provide the additional advantage of allowing reduction on dependence and requirement of mechanical barriers, such as glasses and cement, in the construction of the RTD apparatus.

Figure 2:
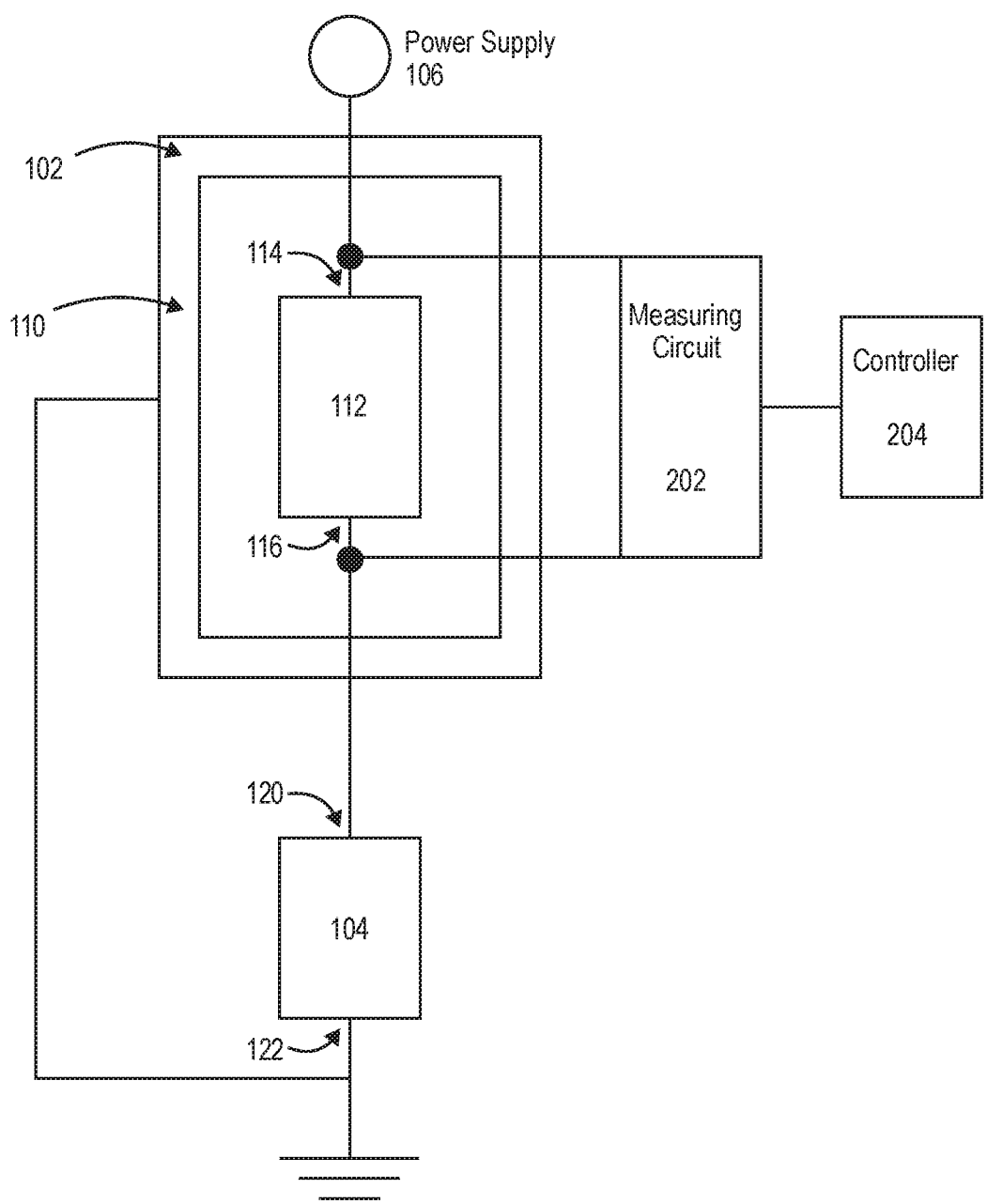
FIG. 2 is a block diagram of an apparatus for improving the stability of an RTD, according to at least one embodiment of the present disclosure.

FIG. 2 is a block diagram of an apparatus (200) for improving the stability of an RTD (102), according to at least one embodiment of the present disclosure. The apparatus (200) of FIG. 2 includes many of the same components of FIG. 1, including the positive power supply (106), the ground (108), the pull-down resistor (104), and the RTD (102) having the case (100) and the resistive meander (112) deposited on the substrate (118).

In addition to the above listed components from FIG. 1, the apparatus (200) of FIG. 2 also includes a measuring circuit (202) and a controller (204). The measuring circuit (202) of FIG. 2 may be an electric circuit that is configured to measure the resistance of the resistive meander.

As explained in FIG. 1, the resistive meander (112) is configured to change resistance as the temperature of the resistive meander changes. The temperature coefficient of resistance (TCR) of the resistive meander defines the correlation between resistance and temperature of the resistive meander. Foreign matter contamination of the resistive meander and low insulation resistance from the leads and the case can cause the measured resistance of the resistive meander to drift from the values expected in accordance with the resistive meander's TCR. The placement of the pull-down resistor (104) relative to the RTD (102) reduces the foreign contamination of the resistive meander and minimizes the effect of the low insulation of the RTD's case and leads, which improves the stability of the RTD, and the values determined by the measuring circuit (202).

Measuring the resistance of the resistive meander may include converting the resistance to a voltage and using the voltage to drive a voltmeter, an operational or instrumentation amplifier, or a high-resolution analog to digital converter. For example, a signal from the RTD may be measured by coupling the resistive meander to one leg of a Wheatstone bridge excited by a constant reference voltage. The output of the Wheatstone bridge may be connected to the voltmeter, the operational or instrumentation amplifier, or the high-resolution analog to digital converter. As another example, the resistance of the resistive meander may be determined by measuring the IR voltage drop across some portion of the RTD, such as the resistive meander, with a precision current reference. The measuring circuit (202) may be configured to determine a voltage or resistance that is provided to a controller (204), which is coupled to the measuring circuit (202). The controller (204) of FIG. 2 may be configured with circuit logic or computer program instructions to receive the raw values from the measuring circuit and use data associated with the temperature coefficient of resistance (TCR) of the resistive meander to determine a temperature of the resistive meander. Although not shown, the controller (204) may include hardware and computer program instructions for transmitting the temperature reading to one or more additional components. For example, the controller (204) may be incorporated into or interface with an engine control unit (ECU) of an automobile to provide the ECU with temperature readings of a medium surrounding an RTD. Readers of skill in the art will realize that the measuring circuit (202) and the controller (204) may be incorporated into a single component or further separated into additional subunits.

Figure 3:
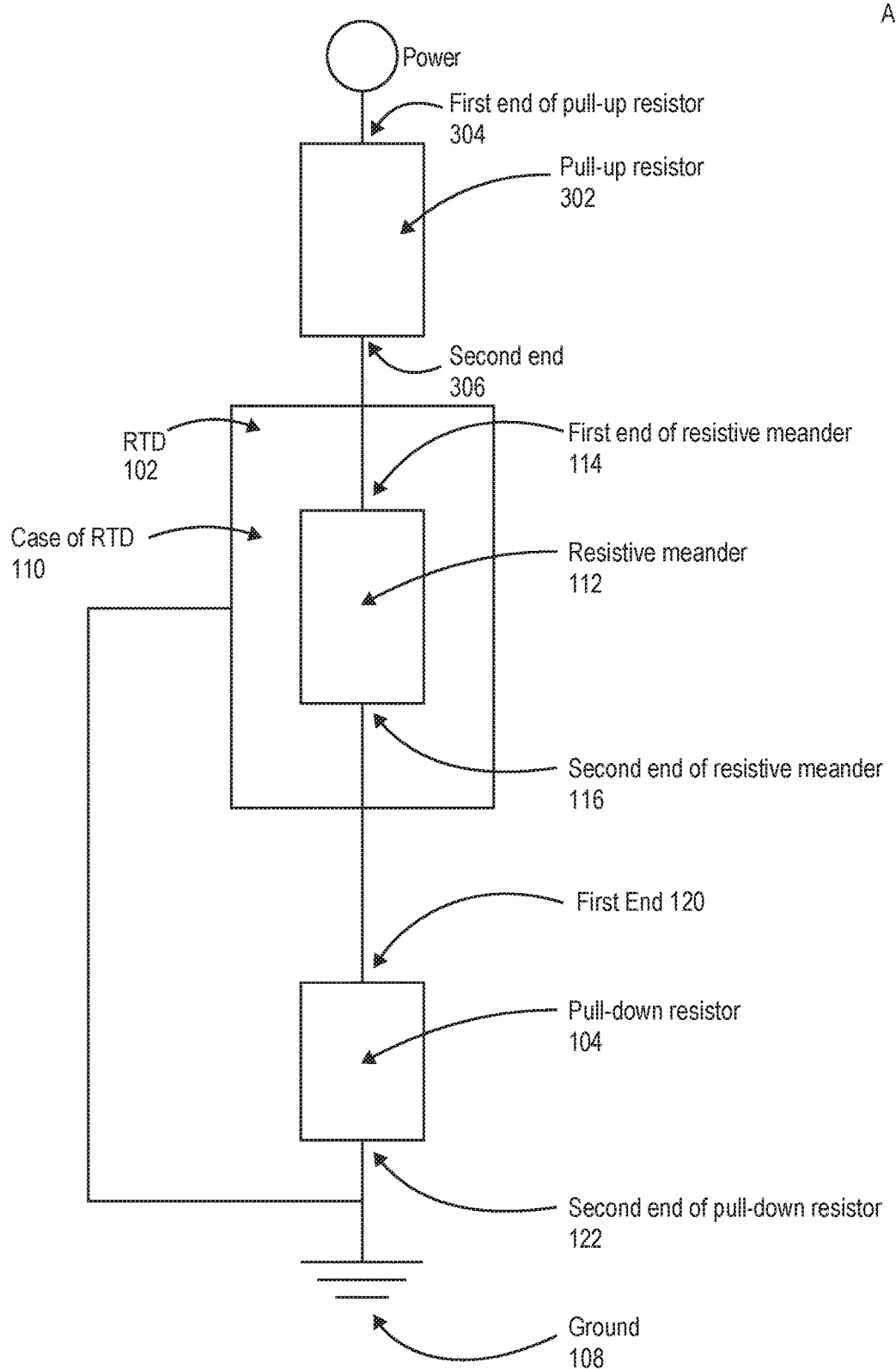
FIG. 3 is a block diagram of an apparatus for improving the stability of an RTD, according to at least one embodiment of the present disclosure.

FIG. 3 is a block diagram of an apparatus (300) for improving the stability of an RTD (102), according to at least one embodiment of the present disclosure. The apparatus (300) of FIG. 3 includes many of the same components of FIG. 1 including the positive power supply (106), the ground (108), the pull-down resistor (104), and the RTD (102) having the case (100) and the resistive meander (112) deposited on the substrate (118).

In addition to the above listed components from FIG. 1, the apparatus (300) of FIG. 3 also includes a pull-up resistor (302). The pull-up resistor (302) of FIG. 3 has a first end (304) coupled to the positive power supply (106) and a second end (306) coupled to the first end (114) of the resistive meander (112). In this configuration, the first end (114) of the resistive meander (112) is provided power from the positive power supply (106) via the pull-up resistor (302).

During operation of the apparatus (300) in which power is provided to the first end (304) of the pull-up resistor (302), because the second end (116) of the resistive meander (112) is coupled to the first end (120) of the pull-down resistor (104), the voltage potential of the second end (116) of the resistive meander (112) is higher than the ground (108) and the case (110) of the RTD (102). In addition, the voltage potential of the first end (114) of the resistive meander (112) is also higher than the ground (108) and the case (110) of the RTD (102). Because the voltage potential of the RTD's resistive meander is higher than the case of the RTD, positive charged ions (e.g., sodium ions) will be drawn to the lowest voltage potential. In the configuration described in FIG. 3, the ground and the case of the RTD have a lower potential than both the first end (114) and the second end (116) of the resistive meander (112). Foreign matter may affect measurements of the voltage potential across the resistive meander and thus the ability of the RTD (102) to maintain the same resistance versus temperature relationship for the same conditions over time. Therefore, an apparatus, such as the apparatus (300) of FIG. 1, which prevents positive charged foreign matter from contaminating the resistive meander (112) of the RTD (102), improves the stability of the RTD.

Figure 4:
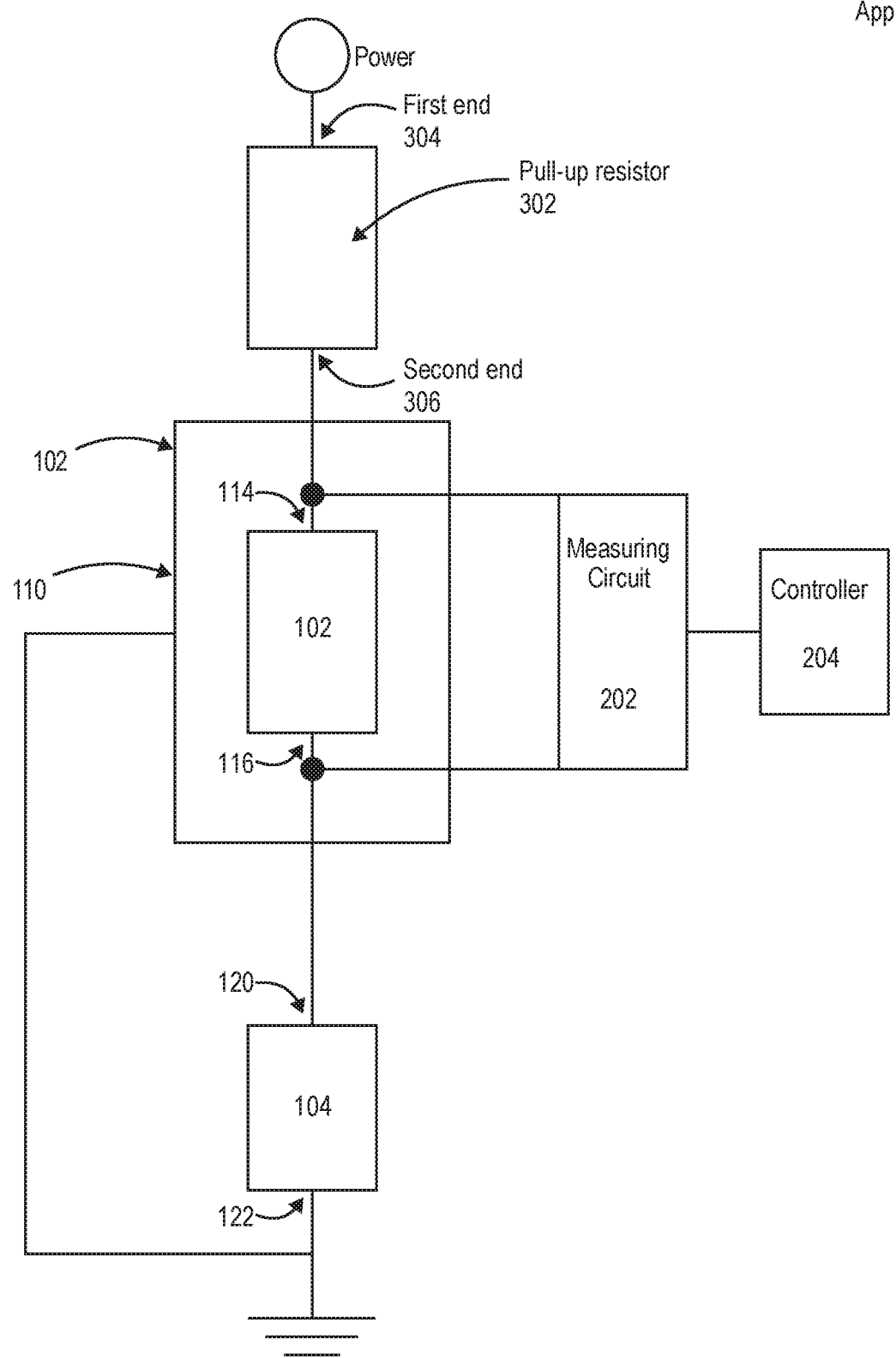
FIG. 4 is a block diagram of an apparatus for improving the stability of an RTD, according to at least one embodiment of the present disclosure.

FIG. 4 is a block diagram of an apparatus (400) for improving the stability of an RTD (102), according to at least one embodiment of the present disclosure. The apparatus (400) of FIG. 4 includes many of the same components of FIGS. 1-3 including the positive power supply (106), the ground (108), the pull-down resistor (104), the pull-up resistor (302), the measuring circuit (202), the controller (204), the RTD (102) having the case (100) and the resistive meander (112) deposited on the substrate (118). As explained in FIG. 2, the measuring circuit (202) and the controller (204) is configured to measure the resistance of the resistive meander (112). The values measured by the measuring circuit (202) may be different for the apparatus (400) of FIG. 4 than the apparatus (200) of FIG. 2 because the apparatus (400) of FIG. 4 includes a pull-up resistor in addition to the components of the apparatus (200) of FIG. 2. However, as explained in FIG. 3, the addition of the pull-up resistor to the configuration will also have the advantages of improved stability of the RTD (102) because the apparatus (400) of FIG. 4 and the apparatus (300) of FIG. 3 also include the pull-down resistor (104), which helps reduce foreign contamination of the resistive meander.

Figure 5A:
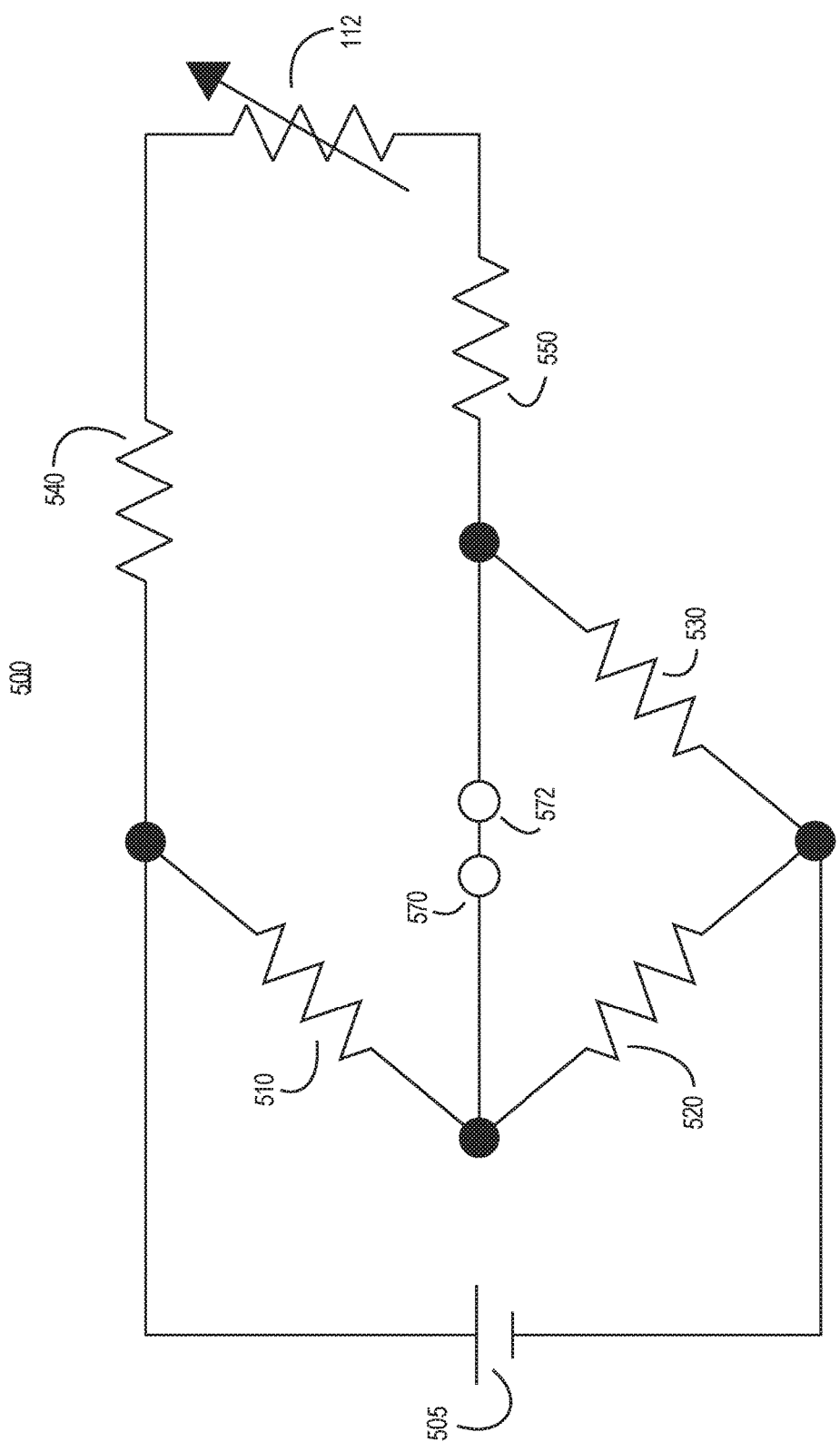
FIG. 5A is a block diagram of an apparatus for improving the stability of an RTD, according to at least one embodiment of the present disclosure.

FIG. 5A is a block diagram of an apparatus (500) for improving the stability of an RTD, according to at least one embodiment of the present disclosure. As explained in FIG. 2 and FIG. 4, a measuring circuit (202) may be coupled to leads connected to the RTD (102), to measure a change in resistance of the resistive meander (112). The apparatus (500) of FIG. 5 illustrates example components of the measuring circuit (202) of FIGS. 2 and 4 for measuring the changes in a resistive meander (112) of the RTD, which is coupled to a pull-down resistor (not shown) and a positive power source (not shown).

In the example of FIG. 5A, the components of the measuring circuit are in a 2-wire configuration having an excitation current source (505), a first bridge resistor (510), a second resistor (520), and a third bridge resistor (530) in a bridge configuration. Also present are a first lead resistor (540) and a second lead resistor (550), which represent the resistance of the leads that couple the bridge configuration to the resistive meander (112). Voltage may be measured at terminals (570) and (572). In operation, the resistance of the resistive meander (112) changes based on the temperature of the resistive meander (112). By measuring the voltage difference between the terminals (570) and (572), one can determine the resistance of the resistive meander (112). With knowledge of the resistance of the resistive meander (112), the temperature being sensed by the resistive meander (112) can be determined. For example, as explained in FIGS. 2 and 4, the controller (204) may associate a value of the output of the measuring circuit with a particular temperature.

Figure 5B:
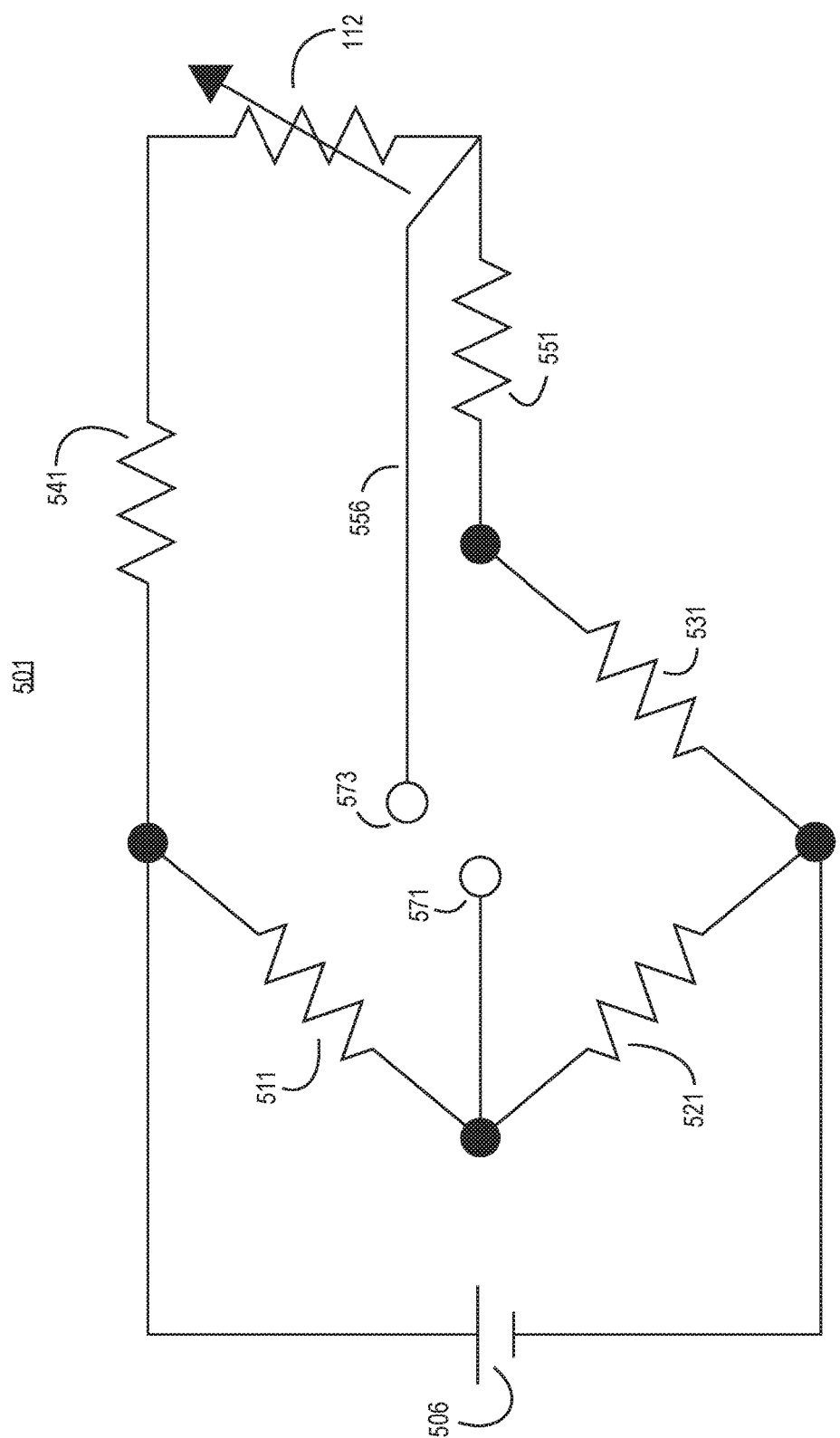
FIG. 5B is a block diagram of an apparatus (500) for improving the stability of an RTD, according to at least one embodiment of the present disclosure.

FIG. 5B is a block diagram of an apparatus (501) for improving the stability of an RTD, according to at least one embodiment of the present disclosure. The apparatus (501) of FIG. 5 illustrates example components of the measuring circuit (202) of FIGS. 2 and 4 for measuring the changes in a resistive meander (112) of the RTD, which is coupled to a pull-down resistor (not shown) and a positive power source (not shown).

The apparatus (501) may be considered a 3-wire configuration of a measuring circuit for measuring the resistance of an RTD. Apparatus (501) includes an excitation current source (506), a first bridge resistor (511), a second bridge resistor (521), and a third bridge resistor (531) in a bridge configuration. Also present are a resistor (541) and a resistor (551), which represent the resistance of the lines that couple the bridge configuration to the resistive meander (112). Also present is a lead (556). In the example of FIG. 5B, voltage is measured at terminals (571) and (573). In operation, the resistance of resistive meander (112) changes based on the temperature of the resistive meander (112). By measuring the voltage difference between terminals (571) and (573), one can determine the resistance of the resistive meander (112). With knowledge of the resistance of the resistive meander (112), the temperature being sensed by the RTD can be determined.

A difference between the apparatus (500) and the apparatus (501) is the presence of the lead (556). This is the third-wire. In apparatus (500), the resistance of leads (540) and (550) can affect the measured resistance of the resistive meander (112). In apparatus (501), the resistance of leads (541) and (551) can cancel each other out because each is coupled to an opposite leg of the bridge and (ideally) the resistance of leads (541) and (551) are equal.

In the example of FIG. 5B, the electrical excitation current may be passed through the bridge resistors (511, 521, 531), and the RTD and bridge output voltage is an indication of the resistance of the resistive meander (112). In a particular embodiment, the excitation current source (506) is very stable and the three bridge resistors (511, 521, and 531) are high-precision resistors that have a very low temperature coefficient. A high-input impedance amplifier (not shown) may be used to measure the resistance change of the RTD with changes in temperature.

It should be understood that FIGS. 5A and 5B merely illustrate two example configurations of the measuring circuit (202) of FIGS. 2 and 4 and other configurations besides two-wire and three-wire configurations can be used.

Figure 6:
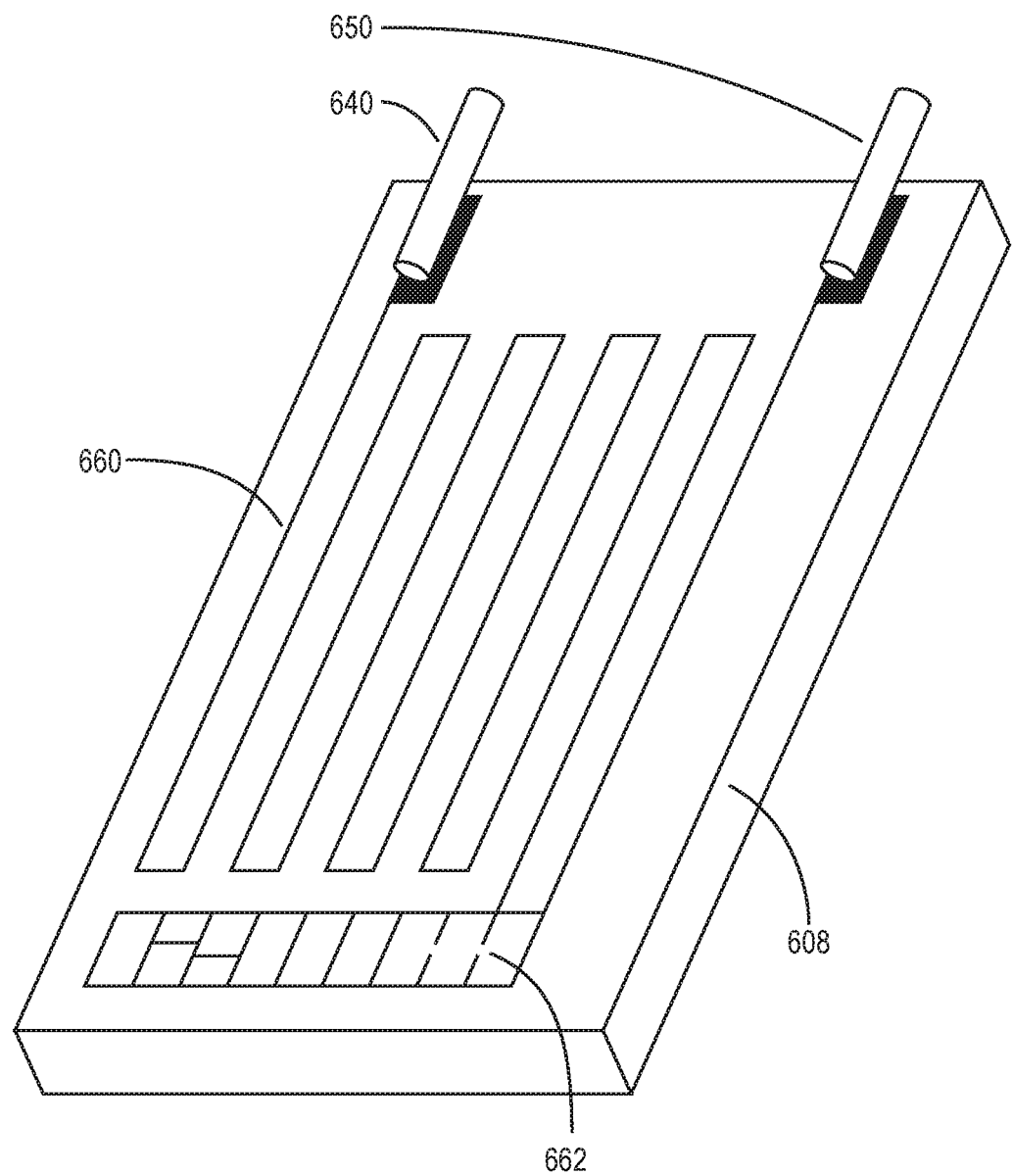
FIG. 6 is an isometric view of an apparatus for improving the stability of an RTD, according to at least one embodiment of the present disclosure.

FIG. 6 is an isometric view of an apparatus (600) for improving the stability of an RTD, according to at least one embodiment of the present disclosure. Apparatus (600) includes a thin-film RTD. It should be understood that embodiments can be used with any type of RTD, both those currently existing and those developed in the future. The apparatus (600) includes two incoming leads (640) and (650), which roughly correspond to elements (540), (550), (541), and (551) of FIG. 5A and FIG. 5B. Apparatus (600) also includes a substrate (608) and a sensing resistor (660), such as the resistive meander (112) of FIG. 1. Substrate (608) can comprise one of a variety of materials. In some embodiments, the substrate (608) is a ceramic substrate. Sensing resistor (660) can comprise one of a variety of different conductive materials. In some embodiments, sensing resistor (660) can be made from platinum. In some embodiments, there can be an extra amount (662) that can be trimmed to create any desired nominal resistance. Although not illustrated, the entire assembly can be coated with a material to protect apparatus (600) and then placed in a case. Example nominal resistances may include 200 ohms, 500 ohms, and 1000 ohms at zero degrees Celsius. In some embodiments, an increased nominal resistance increases the sensitivity of apparatus (600).

Figure 7:
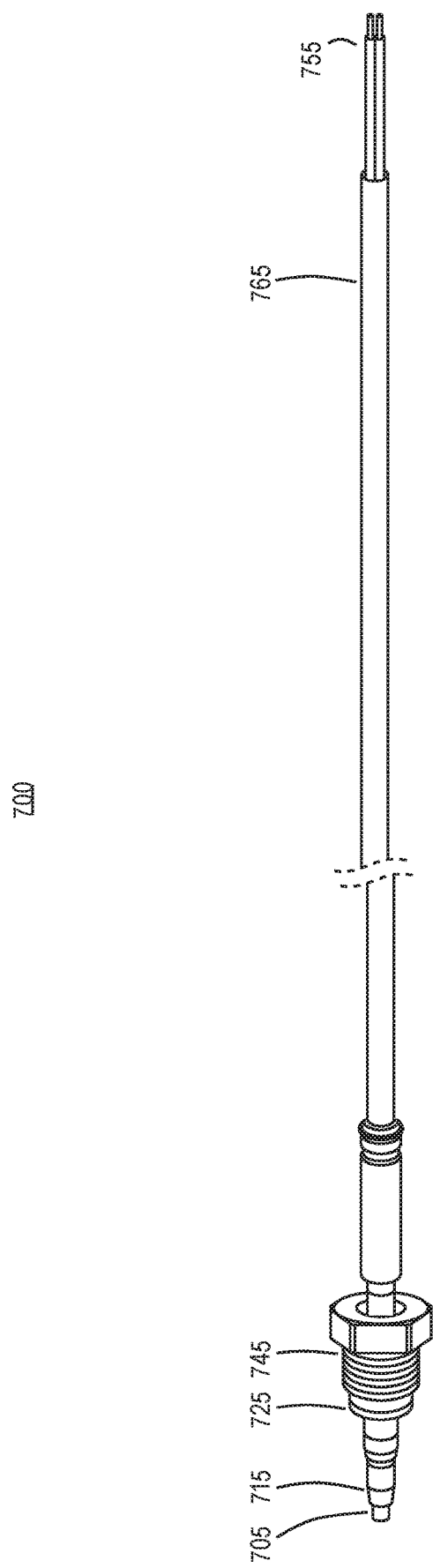
FIG. 7 is an isometric view of an apparatus for improving the stability of an RTD, according to at least one embodiment of the present disclosure.

FIG. 7 is an isometric view of an apparatus (700) for improving the stability of an RTD, according to at least one embodiment of the present disclosure. The apparatus (700) illustrates the full packaging of an exemplary RTD. The sensor portion (705) of apparatus (700) is coupled to a cover (715). A flange (725) couples the smaller sensor portion and cover (715) to nut (735). Screw threads (745) allow the apparatus (700) to be fastened to a place to be monitored in a fixed location. Leads (755) (protected by sheath (765)) are used to electrically couple the sensor portion (705) to a measurement circuit.

Figure 8:
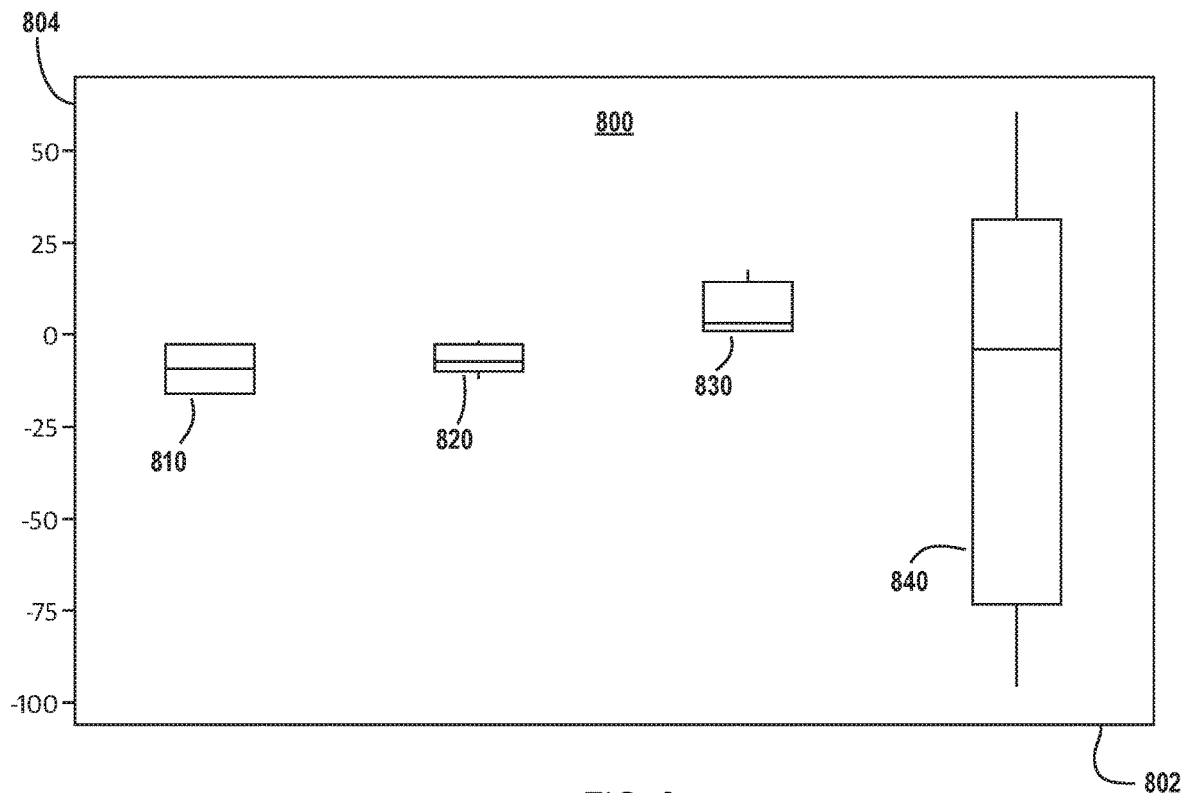
FIG. 8 is a graph illustrating the performance of an RTD apparatus in view of temperature coefficient of resistance (TCR), according to at least one embodiment of the present disclosure.

FIG. 8 is a graph illustrating the performance of an RTD apparatus in view of temperature coefficient of resistance (TCR), according to at least one embodiment of the present disclosure. Exemplary numbers can be used for illustration purposes. In some embodiments, positive power supply is at 5 volts. A "pull-up resistor" configuration, which does not include a pull-down resistor, may have a value of 1000 ohms, the voltage across the RTD is approximately 2.2 volts. Obviously, the voltage of the ground is 0 volts. The voltage drop across the RTD is 2.2 volts.

In the pull-down configuration of FIG. 1, in the same situation, the RTD as a voltage drop of 2.2 volts. However, due to the coupling scheme of FIG. 1, the voltage of the resistive meander is approximately 2.8 volts. Thus, the resistive meander is at approximately 2.8 volts while the voltage of the case is 0 volts because it is grounded. Thus, the resistive meander is positively charged compared to the case. The result is that positively charged contaminants, such as sodium ions, are attracted to the case rather than the resistive meander.

The value of pull-down resistor can be chosen from one of a variety of different values. In some embodiments, the pull-down resistor can have a resistance of 1000 ohms. In some embodiments, the pull-down resistor can have a resistance of 200 ohms. A higher resistance reduces a self-heating effect of the RTD. However, a lower resistance may provide more accurate measurements.

The apparatus (100) of FIG. 1 was compared to several RTDs with different configurations. Each RTD was tested before and after being subjected to a hot temperature (900 degrees Celsius or higher) for an extended period of time (300 to 500 hours). The results are as presented in FIG. 8. In FIG. 8, graph (800) is a boxplot that compares the change in TCR for four different configurations of RTDs. X-axis (802) delineates the four different configurations. Y-axis (804) shows the change in TCR in ppm per degree Celsius. Bar (810) represents an RTD subjected to 300 hours at 900 degrees Celsius and 500 hours at 950 degrees Celsius. Bar (820) represents an RTD without decklid. This RTD was subjected to 500 hours at 950 degrees Celsius. Bar (830) represents another RTD subjected to 500 hours at 950 degrees Celsius. Each of the RTDs of bar (810), (820), and (830) were coupled in the configuration illustrated in FIG. 1. Bar (840) represents an RTD subjected to 500 hours at 900 degrees Celsius and 50 hours and 950 degrees Celsius. The RTD of bar (840) was coupled in the configuration described in the present disclosure as the "pull-up resistor configuration", which does not include a pull-down resistor.

As can be seen in FIG. 8, the performance of bar (840) was the worst. The TCR changed by between +25 and −75 ppm per degrees Celsius. In contrast, each of bars (810), (820), and (830) showed a minimal change. The largest change was bar (830), which had a change ranging from 0 to +10 ppm per degree Celsius. Both bars (810) and (820) had a change in TCR in the range of 0 to −10 ppm per degree Celsius.

Figure 9:
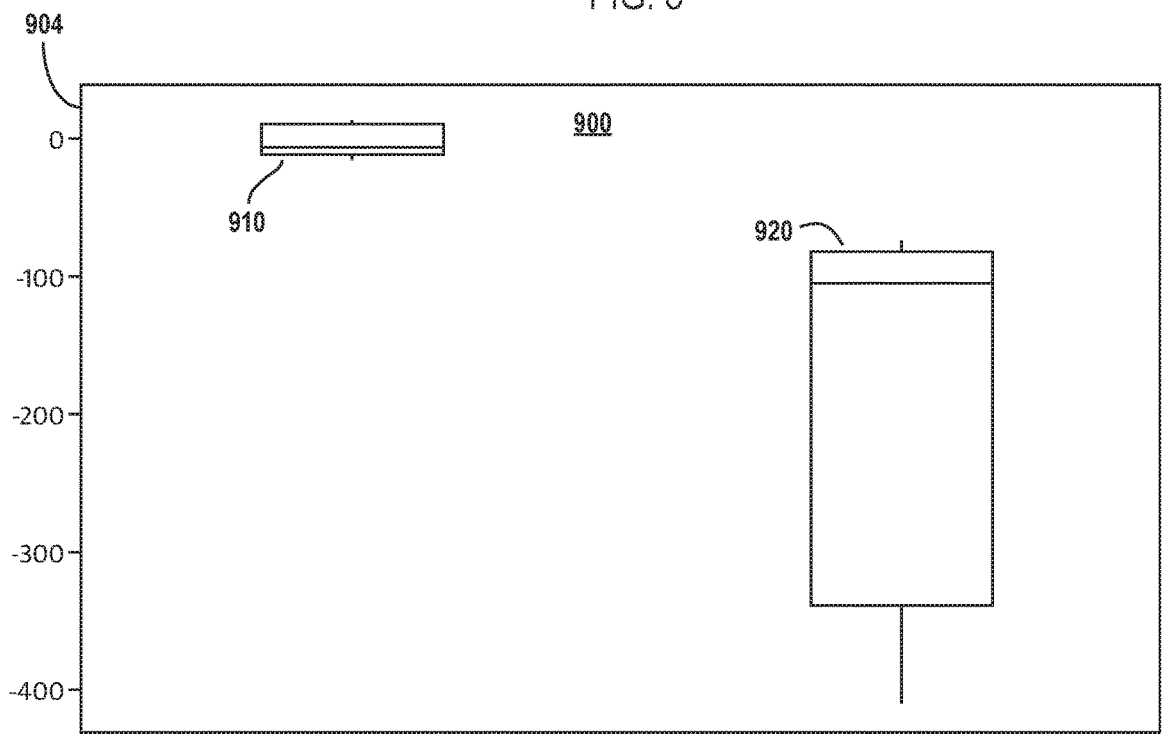
FIG. 9 is graph illustrating the performance of an RTD apparatus in view of temperature readings, according to at least one embodiment of the present disclosure.

FIG. 9 is graph illustrating the performance of an RTD apparatus in view of temperature readings, according to at least one embodiment of the present disclosure. With reference to FIG. 9, the results of additional testing are presented in graphical form. In graph (900), several RTDs with known low insulation resistance were placed in a 900-degree test environment and the readings were determined using two different coupling schemes—the pull-down resistor configuration, such as the apparatus (100) of FIG. 1, and the "pull-up resistor configuration", which does not include a pull-down resistor. Graph (900) is a box plot of the error shown in the reading of the RTD. Y-axis (904) represents the error in the reading of the RTD sensor, in degrees Celsius. Bar (920) shows the error of the RTDs using the "pull-up resistor configuration" with a 1000-ohm resistor. It can be seen that the error ranges from between the sensor reading 90 degrees lower than actual temperature to an outlier reading of about 400 degrees lower than actual temperature. In contrast, the exact same RTDs were coupled using the scheme of the pull-down resistor configuration of the apparatus (100) of FIG. 1. The results are presented as box (910). It can be seen that the errors are drastically minimized, with all readings within 10-15 degrees Celsius of the actual temperature.

Figure 10:
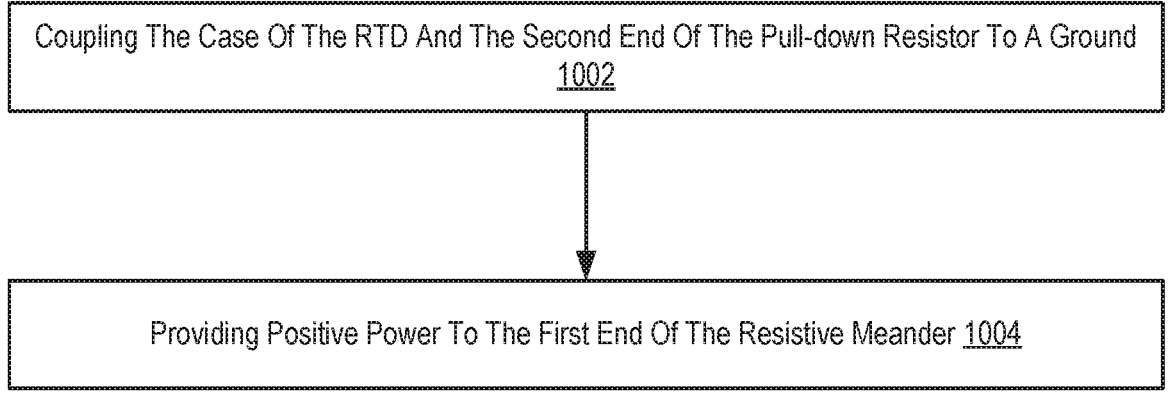
FIG. 10 is a flow chart of a method for improving the stability of an RTD, according to at least one embodiment of the present disclosure.

FIG. 10 is a flow chart of a method for improving the stability of an RTD, according to at least one embodiment of the present disclosure. The method of FIG. 10 may be implemented with the illustrative embodiments of the apparatuses described in FIGS. 1-4.

The method of FIG. 10 includes coupling (1002) the case (110) of the RTD (102) and the second end (122) of the pull-down resistor (104) to a ground (108). Coupling (1002) the case (110) of the RTD (102) and the second end (122) of the pull-down resistor (104) to a ground (108) may include attaching one or more lead wires to the ground.

In addition, the method of FIG. 10 also includes providing (1004) positive power to the first end (114) of the resistive meander (112). Providing (1004) positive power to the first end (114) of the resistive meander (112) may include coupling the first end (114) of the resistive meander (112) to the positive power supply (106).

In a particular embodiment, the method of FIG. 10 is used to purify the resistive meander of the apparatus (100) of FIG. 1 after production of the RTD. This purification process may result in higher chip yield because chips that would normal fail inspection due to meander poisoning may be purified enough to pass inspection. In another embodiment, the method of FIG. 10 is used during normal operation of the RTD to keep foreign ions from poisoning the resistive meander. In a particular embodiment, a method of using the RTD may include using the pull-down resistor configuration to both purify the resistive meander during production and then maintain the purity of the RTD during normal operation.

In an alternative configuration for use during purification, instead of using the pull-down resistor to create a higher voltage potential on the second end of the resistive meander than the housing, positive power may be applied to each end of the resistive meander while the housing of the RTD is coupled to the ground. In this example, poisoning of the resistive meander may be reduced or eliminated because both ends of the resistive meander will have a higher voltage potential than the housing, and any foreign positive ions may be drawn away from the resistive meander and towards the housing.

FIG. 11 is a flow chart of a method for improving the stability of an RTD, according to at least one embodiment of the present disclosure. The method of FIG. 11 may be implemented with the illustrative embodiments of the apparatuses described in the present disclosure. Specific reference is made to the apparatus (200) of FIG. 2 in the description of the method of FIG. 11. The method of FIG. 11 is similar to the method of FIG. 10 in that the method of FIG.

11 also includes coupling (1002) the case (110) of the RTD (102) and the second end (122) of the pull-down resistor (104) to a ground (108) and providing (1004) positive power to the first end (114) of the resistive meander (112).

In addition, the method of FIG. 11 also includes coupling (1102) a measuring circuit (202) to the RTD (102). Coupling (1102) a measuring circuit (202) to the RTD (102) may be carried out by connecting leads from the measuring circuit to leads of the resistive meander. For example, the measuring circuit (202) may be coupled to the first end (114) of the resistive meander (112) and to the second end (116) of the resistive meander (112). In an alternative embodiment, the measuring circuit (202) may be coupled to a ground (108) and to another point with the RTD (102).

The method of FIG. 11 also includes determining (1104), by the measuring circuit (202), a voltage difference. Determining (1104), by the measuring circuit (202), a voltage difference may be carried out by measuring a voltage difference between the first end (114) and the second end (116) of the resistive meander (112). Alternatively, the measuring circuit (202) may measure the voltage difference between the ground and another point within the RTD. Measuring a voltage difference may include converting the resistance to a voltage and using the voltage to drive a voltmeter, an operational or instrumentation amplifier, or a high-resolution analog to digital converter. For example, a signal from the RTD may be measured by coupling the resistive meander to one leg of a Wheatstone bridge excited by a constant reference voltage. As another example, the resistance of the resistive meander may be determined by measuring the IR voltage drop across the resistive meander with a precision current reference. The measuring circuit (202) may be configured to determine a voltage or resistance that is provided to a controller (204), which is coupled to the measuring circuit (202).

The method of FIG. 11 also includes determining (1106), by a controller, a temperature being measured by the RTD (102) based on the voltage difference. Determining (1106), by a controller, a temperature being measured by the RTD (102) based on the voltage difference may be carried out by receiving the raw values from the measuring circuit and using data associated with the temperature coefficient of resistance (TCR) of the resistive meander to determine a temperature of the resistive meander. Although not show, the controller (204) may include hardware and computer program instructions for transmitting the temperature reading to one or more additional components. For example, the controller (204) may be incorporated into or interface with an engine control unit (ECU) of an automobile to provide the ECU with temperature readings of a medium surrounding an RTD.

FIG. 12 is a flow chart of a method for improving the stability of an RTD, according to at least one embodiment of the present disclosure. The method of FIG. 12 may be implemented with the illustrative embodiments of the apparatuses described in the present disclosure. Specific reference is made to the apparatus (300) of FIG. 3 in the description of the method of FIG. 12. The method of FIG. 12 is similar to the method of FIG. 10 in that the method of FIG. 12 also includes coupling (1002) the case (110) of the RTD (102) and the second end (122) of the pull-down resistor (104) to a ground (108) and providing (1004) positive power to the first end (114) of the resistive meander (112).

The method of FIG. 12 includes inserting (1202) a pull-up resistor (302) between a positive power supply (106) and the first end (114) of the resistive meander (112) such that a first end (304) of the pull-up resistor (302) is coupled to the positive power supply (106) and the second end (306) of the pull-up resistor (302) is coupled to the first end (114) of the resistive meander (112). Inserting (1202) a pull-up resistor (302) between a positive power supply (106) and the first end (114) of the resistive meander (112) such that a first end (304) of the pull-up resistor (302) is coupled to the positive power supply (106) and the second end (306) of the pull-up resistor (302) is coupled to the first end (114) of the resistive meander (112) may be carried out by connecting leads from the positive power supply (106) to the leads of the first end (304) of the pull-up resistor (302) and connecting leads from the first end (114) of the resistive meander (112) to the second end (306) of the pull-up resistor (302).

In the method of FIG. 12, providing (1004) positive power to the first end (114) of the resistive meander (112) includes providing (1204) power to the first end (304) of the pull-up resistor (302). Providing (1204) power to the first end (304) of the pull-up resistor (302) may be carried out by coupling the first end (304) of the pull-up resistor (302) to the positive power supply (106).

As explained above, embodiments of the present disclosure may improve the stability or drift of an RTD by reducing or eliminating foreign positive ion contamination of the resistive meander. The present disclosure also discloses that the configuration and placement of the pull-down resistor relative to the RTD may improve the stability of an RTD by reducing the effects of low insulation resistance.

In addition to meander poisoning and low insulation resistance, the stability of an RTD may also be impacted by mechanical shift of R0 (base resistance of the RTD at a particular temperature, such as 0 degree Celsius) by the RTD. For example, if the base resistance of the RTD is actually different than the base resistance that is being used by the measuring circuit or controller, then temperature calculations that are based on the difference between the measured resistance and the stored base resistance may be incorrect. In order to reduce the impact of the mechanical shift of R0 by the RTD, FIG. 13 illustrates a flow chart of a method for improving the stability of an RTD, according to at least one embodiment of the present disclosure.

Figure 13:
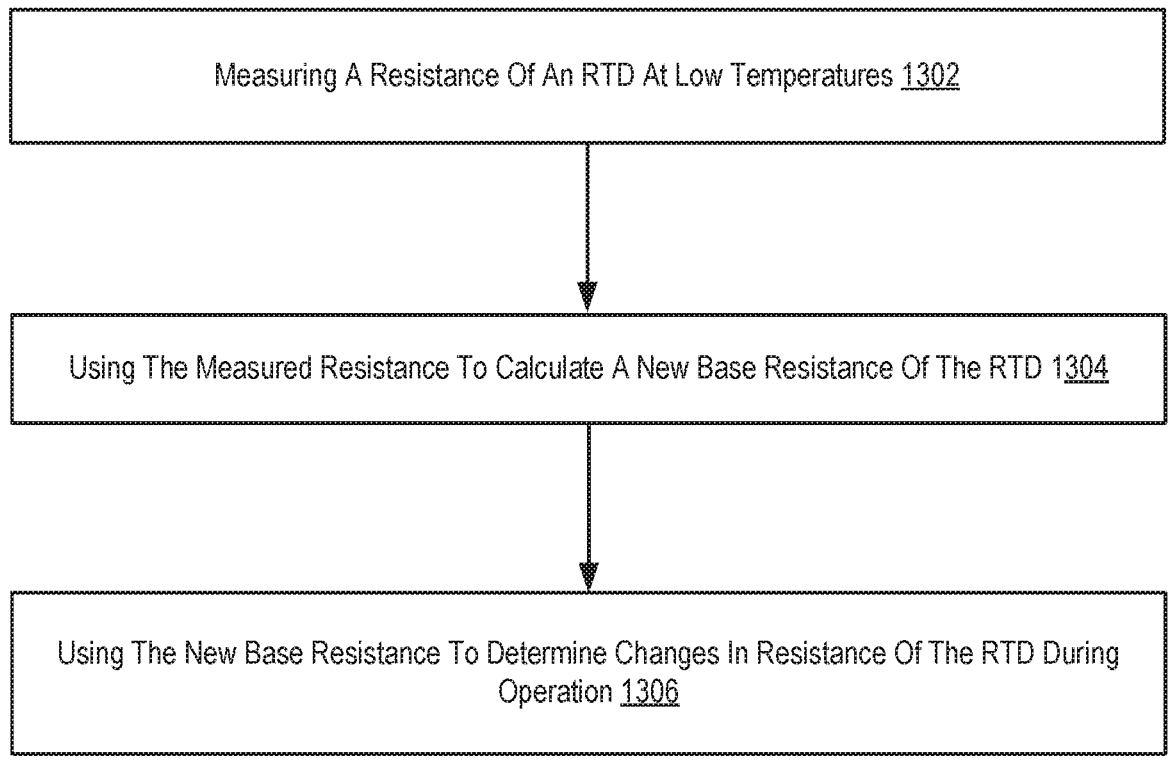
FIG. 13 is a flow chart of a method for improving the stability of an RTD, according to at least one embodiment of the present disclosure.

The method of FIG. 13 includes measuring (1302) a resistance of the RTD at low temperatures. Measuring (1302) the resistance of the RTD at low temperatures may include a car ECU measuring the resistance of the RTD following long engine off conditions. In a particular embodiment, the car ECU may store multiple measurements of the resistance of the RTD during periods of known low temperature conditions.

The method of FIG. 13 also includes using (1304) the measured resistances to calculate a new base resistance (R0) for the RTD. Using (1304) the measured resistances to calculate a new base resistance may be carried out by calibrating and storing a new calculated R0 for the RTD. For example, assuming that all temperature sensors in the car are reading the same temperature, the ECU may be configured to calculate the drift of the base resistance based on the measured resistances.

The method of FIG. 13 also includes using (1306) the new base resistance to determine changes to resistance of the RTD during operation. Using (1306) the new base resistance to determine changes to resistance of the RTD during operation may be carried out by measuring changes to the resistance of the RTD relative to the calculated new base resistance (R0) to identify a more accurate change in resistance of the RTD. Because the base resistance of the RTD is more accurate due this calibration method, any measured changes to the RTD during operation are also more accurate.

Therefore, this calibration method may reduce the impact of mechanical shift of R0 by the RTD chip. When using this calibration method in conjunction with the pull-down resistance configuration, which reduces meander poisoning and the effects of low insulation resistance, the stability of the RTD may be further improved.

The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. No words denoting orientation are used to describe an absolute orientation.

It will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may be dependent from any or all claims in a multiple dependent manner even though such has not been originally claimed.

What is claimed is:

1. An apparatus for improving the stability of a resistance temperature detector (RTD), the apparatus comprising:
   a pull-down resistor, the pull-down resistor having a first end for coupling to a ground; and
   an RTD, the RTD comprising a case surrounding a resistive meander deposited on a substrate, the resistive meander having a first end coupled to a positive power supply and a second end coupled to a second end of the pull-down resistor.

2. The apparatus of claim 1, wherein the resistive meander forms a resistive element having a resistance that varies based on temperature.

3. The apparatus of claim 1, further comprising a pull-up resistor having a first end for coupling to the positive power supply and a second end coupled to the first end of the resistive meander such that the first end of the resistive meander is configured for coupling to the positive power supply via the pull-up resistor.

4. The apparatus of claim 3, further comprising the positive power supply and the ground, the positive power supply coupled to the first end of the pull-up resistor, the ground coupled to the case and the first end of the pull-down resistor.

5. The apparatus of claim 4, wherein during operation in which the positive power supply supplies power to the first end of the pull-up resistor, both the first end and the second end of the resistive meander have a higher voltage potential than the case of the RTD.

6. The apparatus of claim 1, further comprising the positive power supply and the ground, the positive power supply coupled to the first end of the resistive meander, the ground coupled to the case and the first end of the pull-down resistor.

7. The apparatus of claim 6, wherein during operation in which the positive power supply supplies power to the first end of the resistive meander, the second end of the resistive meander has a higher voltage potential than the case of the RTD.

8. The apparatus of claim 6, wherein during operation in which the positive power supply supplies power to the first end of the resistive meander, the first end of the resistive meander has a higher voltage potential than the case of the RTD.

9. The apparatus of claim 6, further comprising a measuring circuit coupled to the first end of the resistive meander and to the second end of the resistive meander.

10. The apparatus of claim 9, wherein the measuring circuit is configured to determine a voltage difference between the first end and the second end of the resistive meander.

11. The apparatus of claim 10, further comprising a controller coupled to the measuring circuit, wherein the controller is configured to determine a temperature being measured by the RTD based on the voltage difference between the first end the second end of the resistive meander.

12. A method for improving the stability of a resistance temperature detector (RTD) using a pull-down resistor, the RTD including a case surrounding a resistive meander having a first end and a second end, the pull-down resistor having a first end and a second end, the second end of the resistive meander coupled to the first end of the pull-down resistor, the method comprising:
   coupling the case of the RTD and the second end of the pull-down resistor to a ground; and
   providing to the first end of the resistive meander, a positive power.

13. The method of claim 12, wherein the second end of the resistive meander has a higher voltage potential than the case of the RTD.

14. The method of claim 12, wherein the first end of the resistive meander has a higher voltage potential than the case of the RTD.

15. The method of claim 12, further comprising coupling a measuring circuit to the first end of the resistive meander and to the second end of the resistive meander.

16. The method of claim 12, further comprising:
   measuring a resistance of the RTD at low temperatures;
   using the measured resistance to calculate a new base resistance of the RTD; and
   using the new base resistance to determine changes in resistance of the RTD during operation.

17. The method of claim 12, further comprising coupling a measuring circuit to the RTD.

18. The method of claim 17, further comprising:
   determining, by the measuring circuit, a voltage difference; and
   determining a temperature being measured by the RTD based on the voltage difference.

19. The method of claim 12, further comprising inserting a pull-up resistor between a positive power supply and the first end of the resistive meander such that a first end of the pull-up resistor is coupled to the positive power supply and the second end of the pull-up resistor is coupled to the first end of the resistive meander.

20. The method of claim 19, wherein providing to the first end of the resistive meander, positive power includes providing power to the first end of the pull-up resistor.

* * * * *